US010762708B2

(12) United States Patent
Sukhomlinov (10) Patent No.: US 10,762,708 B2
(45) Date of Patent: Sep. 1, 2020

(54) PRESENTATION OF SCENES FOR BINOCULAR RIVALRY PERCEPTION

(71) Applicant: Intel Corporation, Santa Clara, CA (US)

(72) Inventor: Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 15/191,014

(22) Filed: Jun. 23, 2016

(65) Prior Publication Data

US 2017/0372517 A1    Dec. 28, 2017

(51) Int. Cl.
*G06T 19/00* (2011.01)
*H04N 13/324* (2018.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ......... G06T 19/00; G06T 17/20; G06T 17/00; G06T 15/10; G06T 15/00; G06T 19/006; G06T 15/205; H04N 13/254; H04N 13/271; H04N 13/324; H04N 13/344; H04N 13/239; H04N 13/25; H04N 13/122; G02B 27/017; G02B 27/0172; G02B 2027/0134; G02B 2027/014
See application file for complete search history.

(56) References Cited

U.S. PATENT DOCUMENTS 5,438,989 A * 8/1995 Hochman ............ A61B 5/0059
                                                          600/426
6,373,965 B1 * 4/2002 Liang ..................... B41M 3/144
                                                          382/112
(Continued)

OTHER PUBLICATIONS

"Nural adaptation," Wikipedia; https://en.wikipedia.org/wiki/Perceptual_adaptation; retrieved Sep. 27, 2016, 7 pages.
(Continued)

*Primary Examiner* — Abderrahim Merouan
(74) *Attorney, Agent, or Firm* — Schwabe, Williamson & Wyatt, P.C.

(57) ABSTRACT

Embodiments herein relate to the display of enhanced stereographic imagery in augmented or virtual reality. In various embodiments, an apparatus to display enhanced stereographic imagery may include one or more processors, an image generation module to generate an enhanced stereoscopic image of a scene having a first two-dimensional (2D) image of the scene and a second 2D image of the same scene that is visually or optically different than the first 2D image to create binocular rivalry perception of the scene when the first and second 2D images are respectively presented to a first and a second eye of a user, and a display module to display the enhanced stereoscopic image to the user, with the first 2D image presented to the first eye of the user and the second 2D image presented to the second eye of the user. Other embodiments may be described and/or claimed.

16 Claims, 7 Drawing Sheets

(51) Int. Cl.
  *H04N 13/344* (2018.01)
  *H04N 13/122* (2018.01)
  *H04N 13/271* (2018.01)
  *H04N 13/254* (2018.01)
  *H04N 13/239* (2018.01)
  *H04N 13/25* (2018.01)
  *G02B 27/01* (2006.01)
  *G06T 15/20* (2011.01)

(52) U.S. Cl.
  CPC ......... *G06T 15/205* (2013.01); *H04N 13/122* (2018.05); *H04N 13/239* (2018.05); *H04N 13/25* (2018.05); *H04N 13/254* (2018.05); *H04N 13/271* (2018.05); *H04N 13/324* (2018.05); *H04N 13/344* (2018.05); *G02B 2027/014* (2013.01); *G02B 2027/0134* (2013.01)

(56) References Cited

U.S. PATENT DOCUMENTS

| | | | | |
|---|---|---|---|---|
| 6,707,577 | B1* | 3/2004 | Morikawa | H04N 1/4051 358/3.03 |
| 6,977,629 | B2* | 12/2005 | Weitbruch | G09G 3/003 345/6 |
| 7,290,878 | B1* | 11/2007 | Hofeldt | A61B 3/08 351/200 |
| 8,538,175 | B1* | 9/2013 | Epstein | H04N 19/20 382/232 |
| 9,270,875 | B2* | 2/2016 | Brisedoux | H04N 5/2258 |
| 9,292,906 | B1* | 3/2016 | Binder | G06T 5/002 |
| 10,521,920 | B2* | 12/2019 | Grunnet-Jepsen | G06T 7/521 |
| 2002/0021832 | A1* | 2/2002 | Dawson | G02B 27/2207 382/154 |
| 2005/0052714 | A1* | 3/2005 | Klug | G03H 1/22 359/3 |
| 2008/0252718 | A1* | 10/2008 | Provitola | G02B 27/2221 348/42 |
| 2009/0147073 | A1 | 6/2009 | Getty | |
| 2009/0195641 | A1* | 8/2009 | Neuman | H04N 13/10 348/47 |
| 2010/0245666 | A1* | 9/2010 | Rosen | G03B 21/26 348/473 |
| 2011/0002533 | A1 | 1/2011 | Inoue et al. | |
| 2012/0019530 | A1* | 1/2012 | Baker | G02B 27/2207 345/419 |
| 2012/0038758 | A1* | 2/2012 | Khassanov | G09G 3/20 348/60 |
| 2012/0147228 | A1* | 6/2012 | Duparre | H04N 9/045 348/262 |
| 2012/0176483 | A1 | 7/2012 | Border et al. | |
| 2012/0249747 | A1* | 10/2012 | Aviv | H04N 13/122 348/47 |
| 2012/0282585 | A1* | 11/2012 | Baer | G09B 5/067 434/307 R |
| 2013/0021447 | A1* | 1/2013 | Brisedoux | H04N 5/2258 348/47 |
| 2013/0063817 | A1* | 3/2013 | Santori | G02B 27/0172 359/471 |
| 2013/0106848 | A1* | 5/2013 | Nguyen | G06T 15/205 345/419 |
| 2013/0194395 | A1* | 8/2013 | Hannuksela | G02B 27/225 348/51 |
| 2013/0215220 | A1* | 8/2013 | Wang | H04N 13/261 348/43 |
| 2013/0293531 | A1* | 11/2013 | Cao | H04N 13/122 345/419 |
| 2013/0342698 | A1* | 12/2013 | Thompson | G06K 9/2018 348/148 |
| 2014/0049536 | A1* | 2/2014 | Neuman | G06T 15/20 345/419 |
| 2014/0055447 | A1* | 2/2014 | Wong | G06T 5/00 345/419 |
| 2014/0078296 | A1* | 3/2014 | Mamiya | G01B 11/2513 348/135 |
| 2014/0320599 | A1* | 10/2014 | Blonde | H04N 13/122 348/43 |
| 2015/0156196 | A1* | 6/2015 | Kim | G06F 21/32 345/156 |
| 2015/0381963 | A1* | 12/2015 | Dal Mutto | H04N 13/254 348/46 |
| 2016/0027363 | A1* | 1/2016 | Lee | G09G 3/2003 345/691 |
| 2016/0050345 | A1 | 2/2016 | Longbotham et al. | |
| 2016/0093207 | A1* | 3/2016 | Di Censo | H04R 1/1091 340/944 |
| 2016/0217609 | A1* | 7/2016 | Kornilov | G06T 15/60 |
| 2017/0004629 | A1* | 1/2017 | Zhao | G06T 7/246 |
| 2017/0103521 | A1* | 4/2017 | Chukka | G06K 9/0014 |
| 2017/0123209 | A1* | 5/2017 | Spitzer | G02F 1/133504 |
| 2017/0161545 | A1* | 6/2017 | Champlin | G06K 9/0014 |

OTHER PUBLICATIONS

International Search Report and Written Opinion dated Jul. 24, 2017 for International Application No. PCT/US2017/031995, 16 pages.

* cited by examiner

PRESENTATION OF SCENES FOR BINOCULAR RIVALRY PERCEPTION

FIELD

Embodiments of the present disclosure generally relate to the field of augmented or virtual reality and, more particularly, to presentation of scenes for binocular rivalry perception.

BACKGROUND

In augmented reality applications, it is sometimes desirable to present rich content covering a significant area of the field of view of a real world picture. The rich content information may block the real world picture and prevent interactions and/or activity based on visual input. Previous solutions have tried to minimize the amount of area used by additional information or have used the application of graphic effects such as transparency. However, the previous methods are limited in that they do not preserve the original image data content in the visible light spectrum because they either cover a portion of the original image data content with opaque presentation of the rich content information or alter a portion of the visible light image when transparent presentation is used.

BRIEF DESCRIPTION OF THE DRAWINGS

Embodiments of the presentation of information in augmented or virtual reality using binocular rivalry techniques of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of the present disclosure describe devices, systems, and techniques to generate and display enhanced stereographic imagery in augmented or virtual reality. In various embodiments, an apparatus to display enhanced stereographic imagery may include one or more processors, an image generation module to generate an enhanced stereoscopic image of a scene having a first two-dimensional (2D) image of the scene and a second 2D image of the same scene that is visually or optically different than the first 2D image to create binocular rivalry perception of the scene when the first and second 2D images are respectively presented to a first and a second eye of a user at substantially the same time or in a coordinated manner, and a display module to display the enhanced stereoscopic image of the scene to the user, with the first 2D image of the scene presented to the first eye of the user and the second 2D image of the same scene presented to the second eye of the user at substantially the same time or in a coordinated manner.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
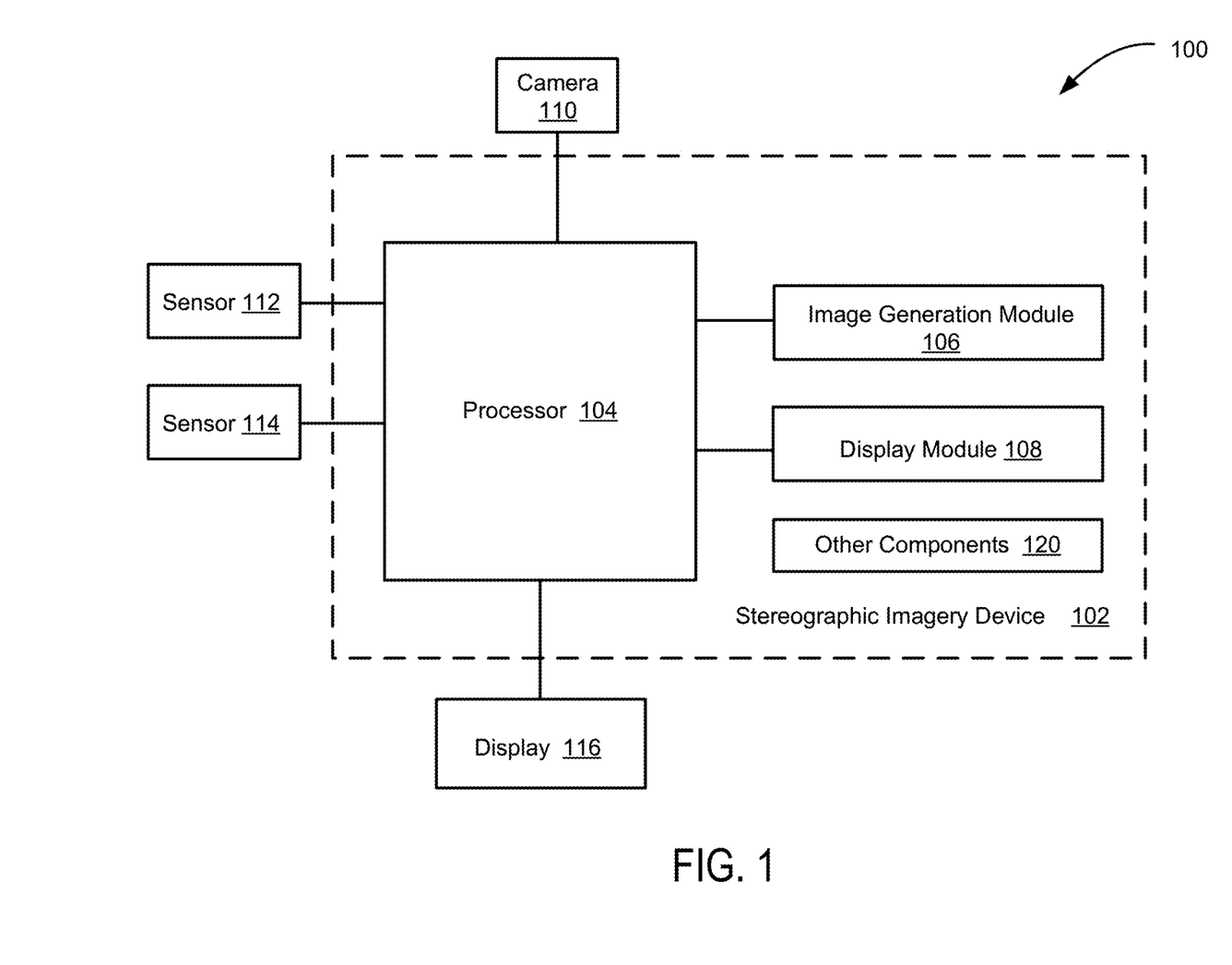
FIG. 1 is a block diagram of a system to generate and display enhanced stereographic imagery of scenes, according to various embodiments.

FIG. 1 is a block diagram of a system 100 to generate and display enhanced stereographic imagery of scenes, according to various embodiments. In some embodiments, the system 100 may include a stereographic imagery device 102 that may include a processor 104 coupled with an image generation module 106 and a display module 108. In various embodiments, the system 100 may further include a camera 110, a first sensor 112, a second sensor 114, and a display 116 coupled with the processor 104. In some embodiments, the first sensor 112 and/or the second sensor 114 may sense aspects of a real scene that are not in the visible electromagnetic spectrum. The first sensor 112 may e.g., be an infrared (IR) sensor and/or the second sensor 114 may e.g., be an ultraviolet (UV) sensor in some embodiments. Although two sensors are shown, it should be understood that a different number of sensors may be present in other embodiments and other types of sensors may be used, such as x-ray sensors, ultrasonic sensors, a depth camera, a 3D camera, or a thermal camera sensor. In some embodiments, more than two sensors may be present.

In various embodiments, the image generation module 106 may be operated on the processor 104 to generate an enhanced stereoscopic image of a scene that may include a first 2D image of the scene and a second 2D image of the same scene based at least in part on one or more camera images captured by the camera 110, where the second 2D image may be visually and/or optically different from the first 2D image. For example, the second 2D image may be a visual representation of a non-visual spectrum of the scene, and/or include a visual element not present in the first 2D image. In various embodiments, color or some other visual representation may be used to represent non-visible aspects of a scene such as infrared or ultraviolet imagery, for example. In some embodiments, the display module 108 may be operated on the processor 104 to display the enhanced stereoscopic image to a user on the display 116. In various embodiments, the display module 108 may present the first 2D image to a first eye of a user and the second 2D image to a second eye of the user at substantially the same time or in a coordinated manner for joint/coordinated perception, thereby facilitating creation of the binocular rivalry effect when the two 2D images are perceived/consumed together. Coordinated manner may include e.g., timed alternate presentation of the two 2D images to the two eyes. Experience has shown that perception/consumption of the two 2D images in this manner may enhance perception of the details of the objects of the scenes within the images. In some embodiments, the first and second 2D images may include sufficient similarity such that stereopsis and 3D perception is achieved when the first and second 2D images are presented to respective first and second eyes of a user. In various embodiments, the first and second 2D images may have at least some common edges on both images, allowing the brain of a user to match the images together when they are presented.

In some embodiments, the image generation module 106 may be configured to generate the second 2D image based at least in part on one or more camera images captured by the camera 110 and sensor data captured by at least one of the first sensor 112 and the second sensor 114. In some embodiments, the image generation module 106 may be configured to generate the second 2D image based at least in part on sensor data captured by more than two sensors. In various embodiments, the visual element not present in the first 2D image may be based at least in part on the sensor data and/or the visual or optical difference between the first 2D image and the second 2D image may be based at least in part on the sensor data.

In some embodiments, the camera 110 may be a camera on a headset, the image generation module 106 may be configured to generate the first 2D image based at least in part on one or more camera images captured by the camera 110, the image generation module 106 may be configured to generate the second 2D image based at least in part on a thermographic image from a thermographic sensor, and the image generation module 106 may align the thermographic image with the one or more camera images. In some embodiments, the first 2D image and the second 2D image may be displayed to a user for applications such as construction and/or maintenance of a building or engineering system to see temperature variations in real-world objects such as hidden wire shorts or overheating due to tension, while allowing the user to simultaneously manipulate the real-world objects as they view them rather than requiring them to shift their view from a thermographic sensor to the real-world object as may be required using previous visualization techniques. In various embodiments, the image generation module 106 may be configured to generate the second 2D image based at least in part on sensor data without including imagery from a camera such as the camera 110 in the second 2D image.

In some embodiments, the image generation module 106 may be configured to generate the first 2D image without using the sensor data. In other embodiments, the image generation module 106 may be configured to generate the first 2D image based at least in part on data from at least one sensor. In various embodiments, the image generation module 106 may be configured to generate additional enhanced stereoscopic images and the display module 108 may be configured to display the enhanced stereoscopic images as video stereoscopic imagery. In various embodiments, the display 116 may include a virtual reality device, a stereoscopic three dimensional (3D) display device that may use polarization or active 3D glasses to display 3D imagery, a device to project imagery directly to a user's eyes, or any other display device configured to display a first 2D image to a first eye of the user and a second 2D image to a second eye of the user.

Figure 2:
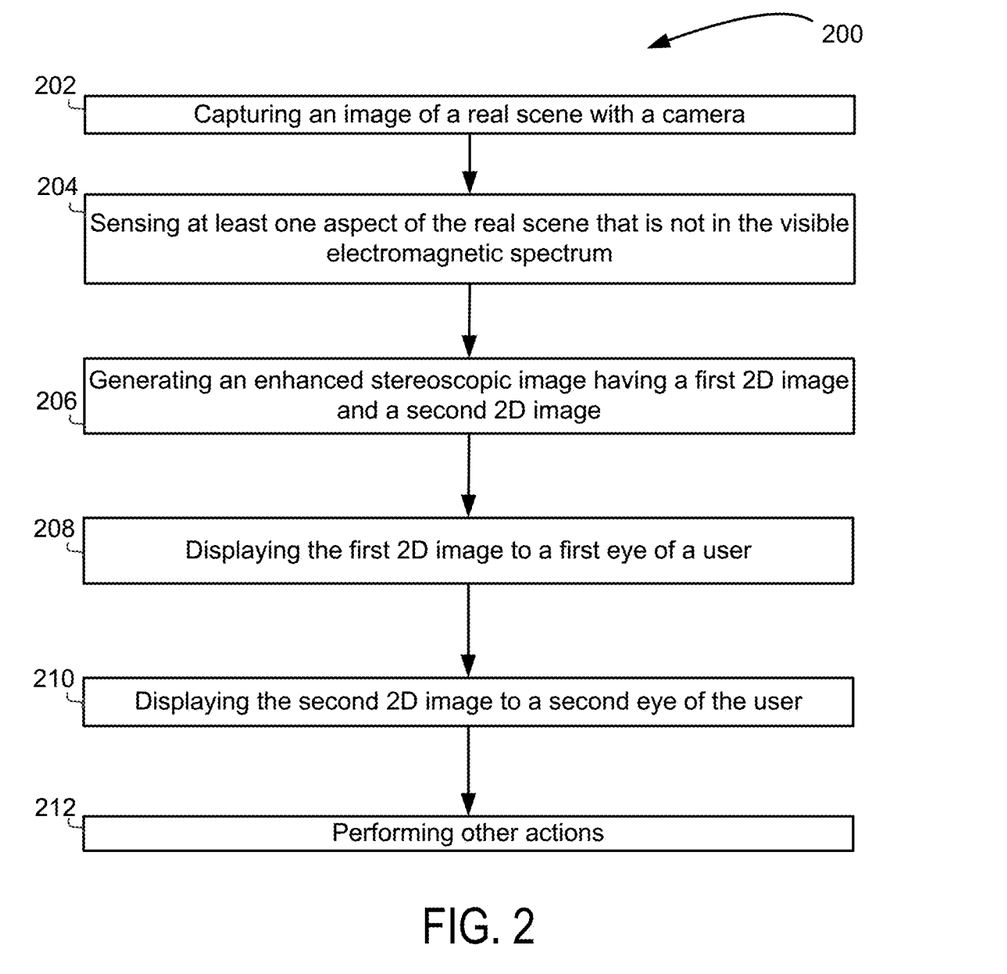
FIG. 2 is a flow diagram illustrating a method of enhanced stereographic image creation and display, according to various embodiments.

FIG. 2 is a flow diagram illustrating a method 200 of enhanced stereographic image creation and display, according to various embodiments. In embodiments, some or all of the method 200 may be practiced by components of the system 100, including components of the stereographic imagery device 102, described with respect to FIG. 1 (optionally, in conjunction with other components of FIG. 1).

In some embodiments, the method 200 may include capturing an image of a real scene with a camera (e.g., camera 110 of FIG. 1) at a block 202. In various embodiments, the method 200 may include sensing at least one aspect of the real scene that is not in the visible electromagnetic spectrum at a block 204. In some embodiments, sensing at least one aspect of the real scene may include capturing an infrared image of the real scene (e.g., with first sensor 112 of FIG. 1) and/or capturing an ultraviolet image of the real scene (e.g., with the second sensor 114 of FIG. 1).

In various embodiments, at a block 206, the method 200 may include generating an enhanced stereoscopic image having a first 2D image and a second 2D image, where the second 2D image be visually and/or optically different from the first 2D image. For example, the second 2D image may be a visual representation of a non-visual spectrum of the scene, and/or includes a visual element not present in the first 2D image. In some embodiments, the enhanced stereoscopic image may be generated based at least in part on at least one camera image of a real scene captured by a camera. In various embodiments, generating the second 2D image may be based at least in part on at least one sensed aspect of the real scene. In some embodiments, generating the enhanced stereoscopic image may include detecting edges of objects in at least one camera image of a real scene captured by a camera, and generating the second 2D image may include removing at least some non-edge imagery from at least one of the camera images and adding the visual element not present in the first 2D image to the second 2D image. In some embodiments, the visual element may include a text label.

At a block 208, the method 200 may include displaying the first 2D image to a first eye of a user in various embodiments. In some embodiments, the method 200 may include displaying the second 2D image to a second eye of the user at a block 210 for perception at substantially the same time or in a coordinated manner. In some embodiments, the first and/or second 2D images may be generated by the processor 104 operating the display module 108 to display the 2D images using the display 116. In various embodiments, the method 200 may include performing other actions at a block 212.

Figure 3:
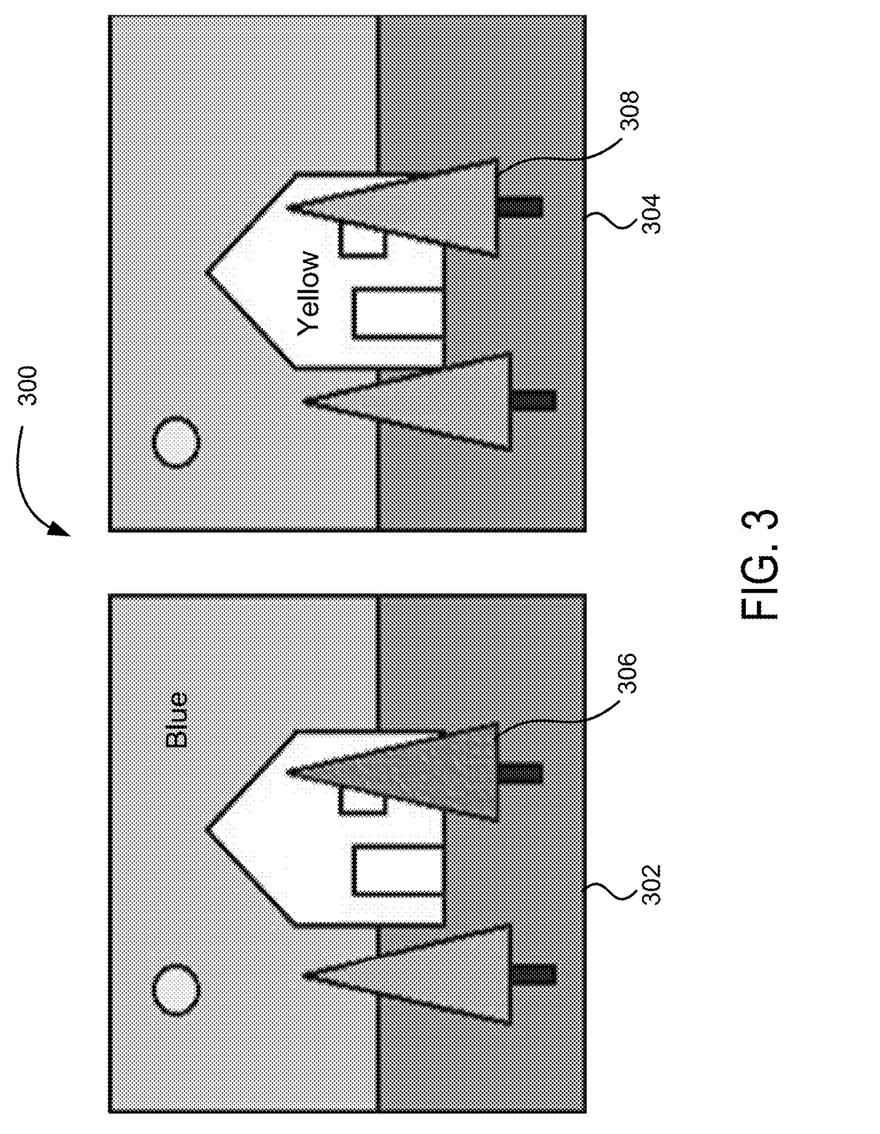
FIG. 3 is a diagram of an enhanced stereoscopic image, according to various embodiments.

FIG. 3 is a diagram of an enhanced stereoscopic image 300, according to various embodiments. In various embodiments, the enhanced stereographic image 300 may be generated in a virtual reality environment and may include a first 2D image 302 and a second 2D image 304. Although shown in grayscale, it should be understood that the enhanced stereographic image 300 may be displayed in color in some embodiments. Although the enhanced stereographic image 300 includes relatively simple two dimensional objects in each of the first and second 2D images, it should be understood that enhanced stereoscopic images using two 2D representations of more complex three dimensional forms may also be generated and displayed in a VR environment according to some embodiments.

As shown, in some embodiments, the enhanced stereoscopic image may include a text label added to the first 2D image 302, indicated as "Blue" and a second text label added to the second 2D image 304, indicated as "Yellow", where the text labels on each of the first and second 2D images 302-304 do not overlap when viewed stereoscopically. In some embodiments, other visual elements may also be present in one of the 2D images that is not present in the other. In the first 2D image 302, a first tree 306 is shown with a visual texture, while a second tree 308 in the second 2D image 304 that corresponds with a location of the first tree 306 does not include the visual texture of first tree 306. Experience has shown that joint perception/consumption of the two 2D images 302-304 may enhance perception of the details of the objects of the scenes within the images, when the two images are respectively presented to first and second eyes of a user at substantially the same time or in a coordinated manner.

Figure 4:
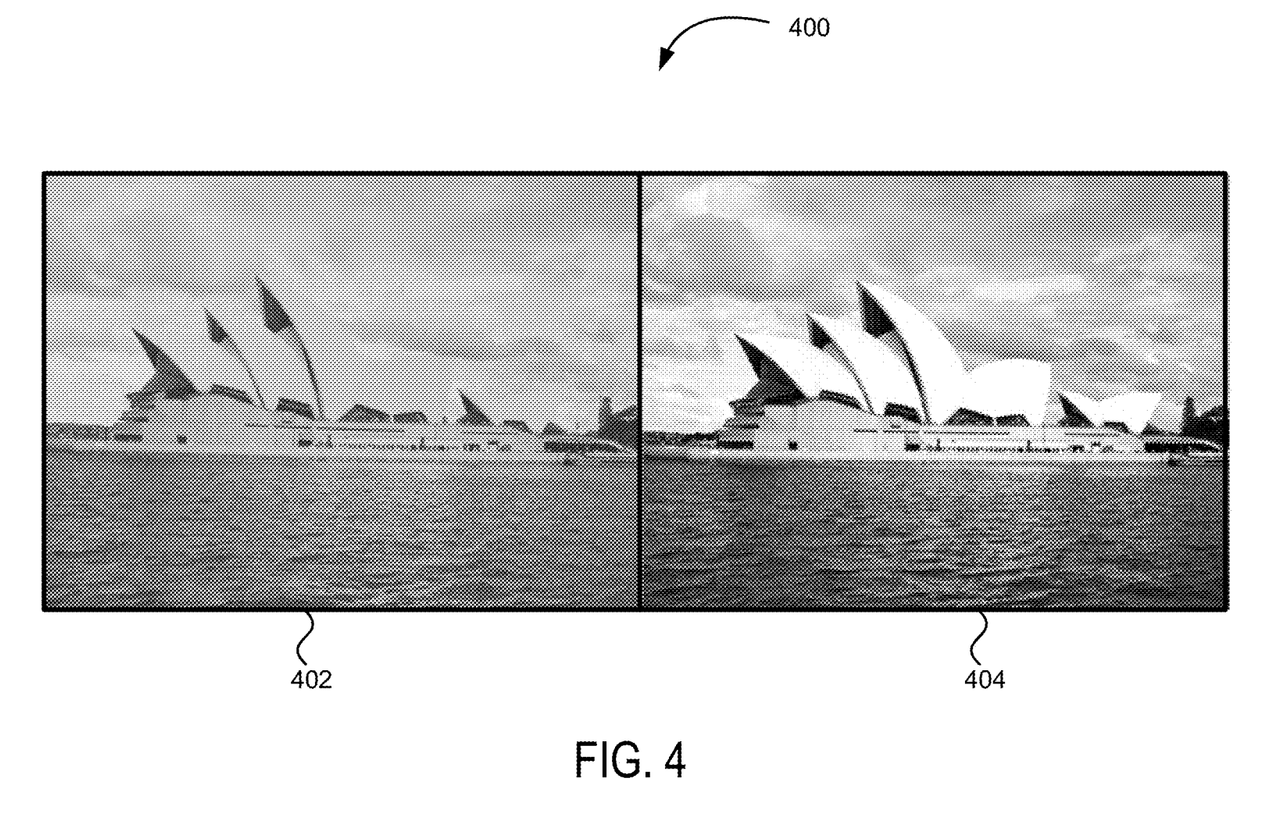
FIG. 4 is a representation of an enhanced stereoscopic image, according to various embodiments.

FIG. 4 is a representation of an enhanced stereoscopic image 400, according to various embodiments. In various embodiments, the enhanced stereographic image 400 may be generated in an augmented reality environment and may include a first 2D image 402 and a second 2D image 404. Although shown in grayscale for illustrative purposes, it should be understood that the enhanced stereographic image 400 may be displayed in color in some embodiments. In some embodiments, the first 2D image 402 may be a grayscale representation of a first image having a red (R) channel of a color camera image of a scene inverted to highlight areas in the shade, while the second 2D image 404 may be a grayscale representation of a second image that may use an unaltered color camera image of the same scene. Although the images are shown as grayscale representations for illustrative purposes, it should be understood that color images may be used in various embodiments. Although the enhanced stereographic image 400 includes a black border around the first and second 2D images for clarity, it should be understood that the black border may not be present in some embodiments. Similar to the coordinated presentation of the two complementary 2D images 302-304, experience has shown that joint perception/consumption of the two 2D images 402-404 may enhance perception of the details of the objects of the scenes within the images, when the two images 402-404 are respectively presented to first and second eyes of a user at substantially the same time or in a coordinated manner.

Figure 5:
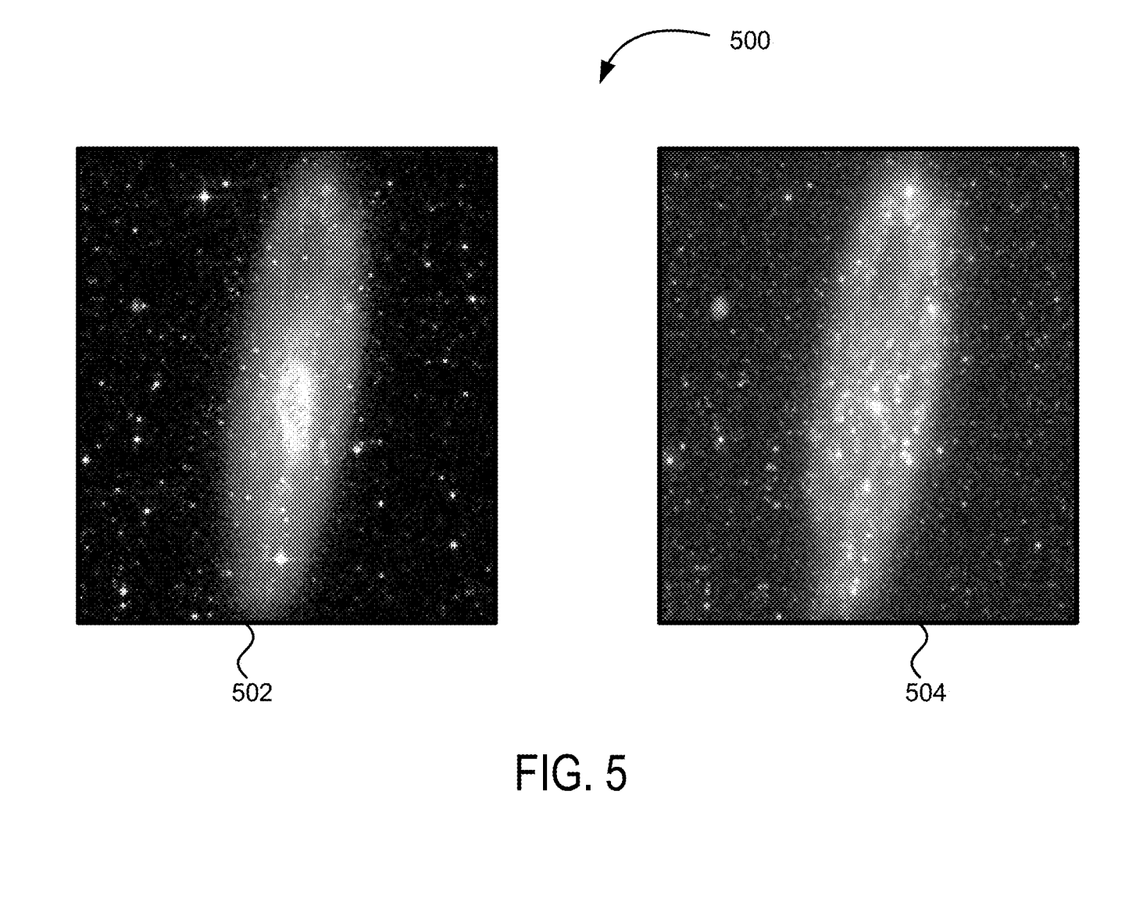
FIG. 5 is a representation of another enhanced stereoscopic image, according to various embodiments.

FIG. 5 is a representation of another enhanced stereoscopic image 500, according to various embodiments. In various embodiments, the enhanced stereographic image 500 may present multispectral blending using binocular rivalry and may include a first 2D image 502 and a second 2D image 504. In some embodiments, the first 2D image 502 may represent imagery in the visible light range and the second 2D image 504 may represent imagery in a non-visible portion of the electromagnetic spectrum such as the UV range. Although shown in grayscale, it should be understood that the enhanced stereoscopic image 500 may be displayed in color in some embodiments. Although the enhanced stereographic image 400 includes a black border around the first and second 2D images for clarity, it should be understood that the black border may not be present in some embodiments. Similar to the coordinated presentation of the complementary 2D images 302-304 and 402-404, experience has shown that joint perception/consumption of the two 2D images 502-504 may enhance perception of the details of the objects of the scenes within the images, when the two images 502-504 are respectively presented to first and second eyes of a user at substantially the same time or in a coordinated manner. In various embodiments, the system 100 of FIG. 1 and/or the method 200 of FIG. 2 may be used to generate and display enhanced stereographic images such as the enhanced stereographic image 300, 400, or 500 of FIGS. 3-5.

Figure 6:
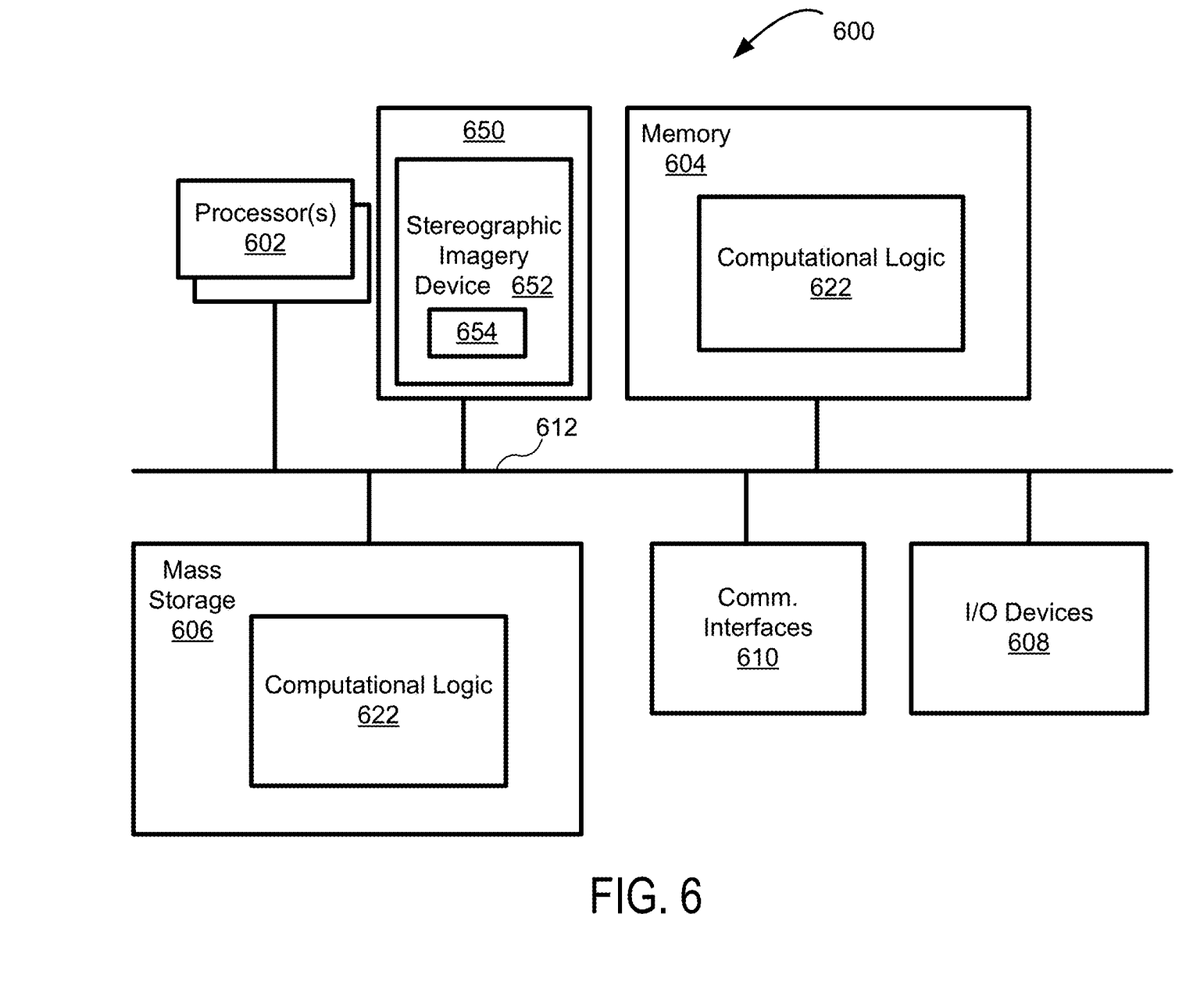
FIG. 6 schematically illustrates an example computer device to generate and display enhanced stereographic imagery, according to various embodiments.

FIG. 6 illustrates an example computer device 600 that may include components corresponding to and/or implementing various components and methods of FIGS. 1-5, such as stereographic imagery device 102 with image generation module 106 and display module 108, described with respect to FIG. 1, in accordance with various embodiments. As shown, computer device 600 may include one or more processors 602, each having one or more processor cores, and system memory 604. The processor 602 may include any type of processors, single or multi-core microprocessors, and the like. The processor 602 may be implemented as an integrated circuit. The computer device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computer device 600 may further include input/output devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). The computer device 600 may include a stereographic system 650 having enhanced stereographic image generation and display capabilities that may include a stereographic imagery device 652 and an image generation module 654. In various embodiments, the stereographic system 650 may be configured similarly to the system 100, the stereographic imagery device 652 may be configured similarly to the stereographic imagery device 102, and/or the image generation module 654 may be configured similarly to the image generation module 106. In some embodiments, the computer device 600 may include a portion of the stereographic system 650, such as the stereographic imagery device 652 and/or the image generation module 654 without including other components of the stereographic system 650.

The communication interfaces 610 may include communication chips (not shown) that may be configured to operate the computer device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computer device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions, such as drivers, for the operation of various components of computer device 600, including but not limited to operation of the system 100 of FIG. 1, the image generation module 106 of FIG. 1, the display module 108 of FIG. 1, the processor 104 of FIG. 1, the other components 120 of FIG. 1, an operating system of computer device 600, and/or one or more applications, collectively referred to as computational logic 622. The various elements may be implemented by assembler instructions supported by processor(s) 602 or high-level languages that may be compiled into such instructions.

The permanent copy of the programming instructions may be placed into mass storage devices 606 in the factory or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computer device 600 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 602 may be packaged together with all or portions of computational logic 622 configured to facilitate aspects of embodiments described herein to form a System in Package (SiP) or a System on Chip (SoC).

The computer device 600 may include or otherwise be associated with a stereographic imagery system that may include components and/or implement methods described with respect to FIGS. 1-2, such as the stereographic imagery device 102, the image generation module 106, or the display module 108 as described above. In some embodiments, one or more components such as processor 602 may be included as a part of the stereographic imagery device 102.

In various implementations, the computer device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computer device 600 may be any other electronic device that processes data.

Figure 7:
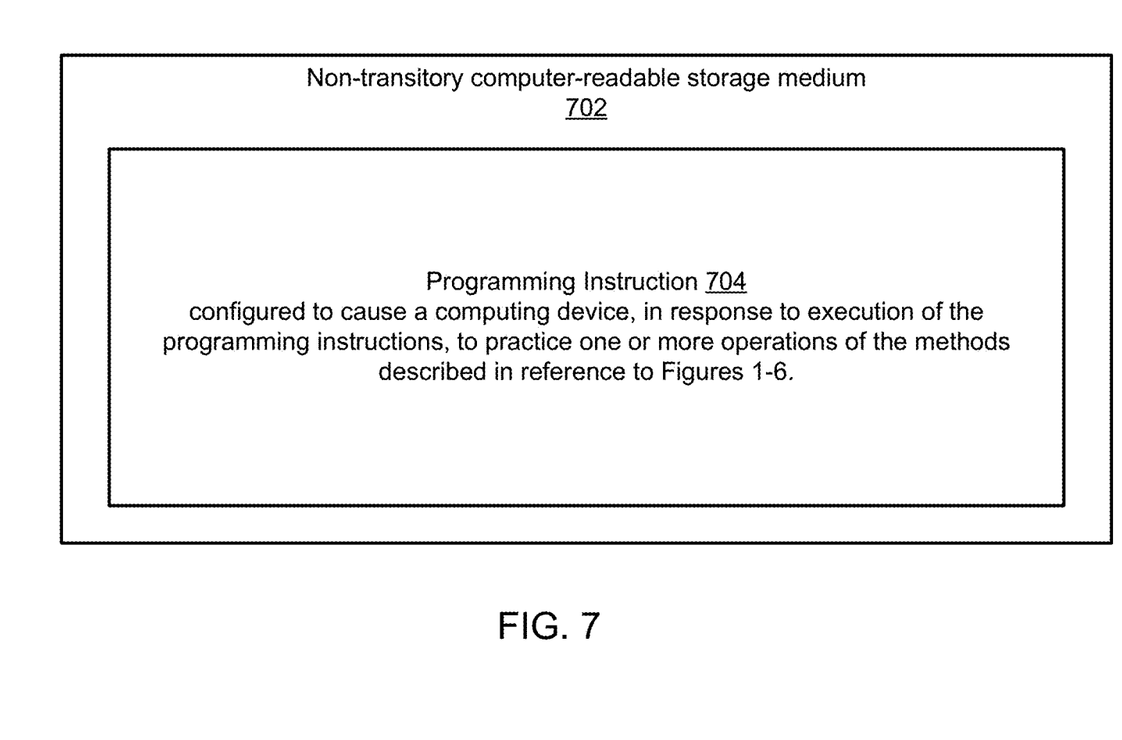
FIG. 7 illustrates an example storage medium with instructions configured to enable an apparatus to practice various aspects of the present disclosure, in accordance with various embodiments.

FIG. 7 illustrates example computer-readable storage medium 702 having instructions configured to practice all or selected ones of the operations associated with the computer device 600, earlier described with respect to FIG. 6; the system 100 of FIG. 1; the image generation module 106; the display module 108; and/or the other components 120 of FIG. 1, in accordance with various embodiments. As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., computer 600, system 100, image generation module 106, and/or display module 108 in response to execution of the programming instructions 704, to perform, e.g., but not limited to, various operations described for the image generation module 106, the display module 108, and/or the other components 120 shown in FIG. 1, or operations shown in process 200 of FIG. 2. In alternate embodiments, programming instructions 704 may be disposed on multiple computer-readable storage media 702. In alternate embodiment, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects described for the image generation module 106, the display module 108, and/or other components of the stereographic imagery device 102 shown in FIG. 1, or operations shown in process 200 of FIG. 2. For an embodiment, at least one of processors 602 may be packaged together with memory having all or portions of computational logic 622 configured to practice aspects described for the image generation module 106, the display module 108, and/or other components of the stereographic imagery device 102 shown in FIG. 1, or operations shown in process 200 of FIG. 2 to form a System in Package (SiP). For an embodiment, at least one of processors 602 may be integrated on the same die with memory having all or portions of computational logic 622 configured to practice aspects described for the image generation module 106, the display module 108, and/or other components of the stereographic imagery device 102 shown in FIG. 1, or operations shown in process 200 of FIG. 2. For an embodiment, at least one of processors 602 may be packaged together with memory having all or portions of computational logic 622 configured to practice aspects of the image generation module 106, the display module 108, and/or other components of the stereographic imagery device 102 shown in FIG. 1, or operations shown in process 200 of FIG. 2 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an apparatus to display enhanced stereographic imagery, comprising: one or more processors; an image generation module, to be operated on the one or more processors, to generate an enhanced stereoscopic image of a scene, wherein the image generation module is to generate a first two dimensional (2D) image of the scene and a second 2D image of the same scene, the second 2D image to be visually or optically different than the first 2D image to create binocular rivalry perception of the scene when the first and second 2D images are respectively presented to a first and a second eye of a user at substantially the same time or in a coordinated manner; and a display module, to be operated on the one or more processors, to display the enhanced stereoscopic image of the scene to the user, wherein the display module is to present the first 2D image to the first eye of the user and the visually or optically different second 2D image of the same scene to the second eye of the user at substantially the same time or in a coordinated manner.

Example 2 may include the subject matter of Example 1, wherein the image generation module is to generate the first 2D image based at least in part on a first camera image of a real scene and the image generation module is to generate the second 2D image based at least in part on a second camera image of the real scene.

Example 3 may include the subject matter of Example 2, wherein the image generation module is to generate the second 2D image based at least in part on sensor data, wherein the sensor data corresponds to an aspect of the real scene that is not in the visible electromagnetic spectrum, and wherein the image generation module is to generate the first 2D image without using the sensor data.

Example 4 may include the subject matter of Example 3, wherein the sensor data corresponds to at least one of ultraviolet or infrared imagery of the real scene.

Example 5 may include the subject matter of any one of Examples 1-4, wherein the second 2D image includes a visual element not present in the first 2D image.

Example 6 may include the subject matter of Example 5, wherein the visual element not present in the first 2D image includes a text label.

Example 7 may include the subject matter of Example 6, wherein the visual element is a first visual element and the text label is a first text label, wherein the first 2D image includes a second visual element that includes a second text label that is not present in the second 2D image, wherein the first and second text labels do not overlap when viewed stereoscopically.

Example 8 may include the subject matter of any one of Examples 1-7, wherein the enhanced stereoscopic image is a first enhanced stereoscopic image, the image generation module is to generate additional enhanced stereoscopic images, and the display module is to successively display the first enhanced stereoscopic image and the additional enhanced stereoscopic images as video stereoscopic imagery.

Example 9 may include a system to display enhanced stereographic imagery comprising: a camera; one or more processors coupled with the camera; a display coupled with the one or more processors; an image generation module, to be operated on the one or more processors, to generate an enhanced stereoscopic image of a scene, wherein the image generation module is to generate a first two dimensional (2D) image of the scene and a second 2D image of the same scene based at least in part on one or more camera images captured by the camera, the second 2D image to be visually or optically different than the first 2D image to create binocular rivalry perception of the scene when the first and second 2D images are respectively presented to a first and a second eye of a user at substantially the same time or in a coordinated manner; and a display module, to be operated on the one or more processors, to display the enhanced stereoscopic image to the user on the display, wherein the display module is to present the first 2D image of the scene to the first eye of the user and the second 2D image to the second eye of the user at substantially the same time or in a coordinated manner.

Example 10 may include the subject matter of Example 9, further comprising a sensor coupled with the one or more processors, wherein the image generation module is to generate the second 2D image based at least in part on one or more camera images captured by the camera and sensor data captured by the sensor.

Example 11 may include the subject matter of Example 10, wherein the sensor is an infrared sensor and the sensor data includes infrared image data.

Example 12 may include the subject matter of Example 11, wherein the sensor is a first sensor and the system further comprises an ultraviolet sensor coupled with the one or more processors, wherein the image generation module is also to generate the second 2D image based at least in part on ultraviolet image data captured by the ultraviolet sensor.

Example 13 may include a method for enhanced stereographic image creation comprising: generating, by a computer device, an enhanced stereoscopic image of a scene having a first two-dimensional (2D) image of the scene and a second 2D image of the same scene, wherein the second 2D image is visually or optically different than the first 2D image to create binocular rivalry perception of the scene when the first and second 2D images are respectively presented to a first and a second eye of a user at substantially the same time or in a coordinated manner; displaying the first 2D image to the first eye of the user; and displaying the second 2D image to the second eye of the user.

Example 14 may include the subject matter of Example 13, wherein the enhanced stereoscopic image is generated based at least in part on at least one camera image of a real scene captured by a camera.

Example 15 may include the subject matter of Example 14, further comprising sensing at least one aspect of the real scene, wherein the at least one aspect is not in the visible electromagnetic spectrum, and wherein generating the second 2D image is based at least in part on the sensed at least one aspect.

Example 16 may include the subject matter of Example 15, wherein sensing the at least one aspect includes capturing at least one of an infrared image or an ultraviolet image of the real scene, and wherein generating the second 2D image is based at least in part on at least one of the infrared image or the ultraviolet image.

Example 17 may include the subject matter of any one of Examples 14-16, wherein generating the enhanced stereoscopic image includes: detecting edges of objects in at least one of the at least one camera image; and generating the second 2D image by removing at least some non-edge imagery from the at least one of the at least one camera image and adding a visual element to the second 2D image.

Example 18 may include the subject matter of Example 17, wherein the visual element includes a text label.

Example 19 may include the subject matter of any one of Examples 17-18, wherein the visual element is a first visual element and the first 2D image includes a second visual element not present in the second 2D image, wherein the first and second visual elements do not overlap when the first and second 2D images are viewed stereoscopically.

Example 20 may include one or more computer-readable media comprising instructions that cause a computing device, in response to execution of the instructions by the computing device, to: generate an enhanced stereoscopic image of a scene having a first two-dimensional (2D) image of the scene and a second 2D image of the same scene, wherein the second 2D image is visually or optically different than the first 2D image to create binocular rivalry perception of the scene when the first and second 2D images are respectively presented to a first and a second eye of a user at substantially the same time or in a coordinated manner; display the first 2D image to the first eye of the user; and display the second 2D image to the second eye of the user.

Example 21 may include the subject matter of Example 20, wherein the instructions are further to cause the computing device to generate the first 2D image based at least in part on a first camera image of a real scene and to generate the second 2D image based at least in part on a second camera image of the real scene.

Example 22 may include the subject matter of Example 21, wherein the instructions are further to cause the computing device to generate the second 2D image based at least in part on sensor data, wherein the sensor data corresponds to an aspect of the real scene that is not in the visible electromagnetic spectrum.

Example 23 may include the subject matter of Example 22, wherein the sensor data includes at least one of an infrared image or an ultraviolet image of the real scene and a visual difference between the second 2D image and the first 2D image is generated based at least in part on at least one of the infrared image or the ultraviolet image.

Example 24 may include the subject matter of Example 22, wherein the sensor data includes an infrared image and an ultraviolet image of the real scene and a visual difference between the second 2D image and the first 2D image is generated based at least in part on the infrared image and the ultraviolet image.

Example 25 may include the subject matter of Example 24, wherein the instructions are further to cause the computing device to display the second 2D image using a red channel, a blue channel, and a green channel, wherein a first one of the red, blue, and green channels is to be used to display imagery based at least in part on the ultraviolet image, a second one of the red, blue, and green channels is to be used to display imagery based at least in part on the infrared image, and a third one of the red, blue, and green channels is to be used to display imagery based at least in part on the second camera image.

Example 26 may include the subject matter of any one of Examples 20-25, wherein the instructions are to cause the computing device to display the first and second 2D images in a virtual reality environment.

Example 27 may include the subject matter of any one of Examples 20-25, wherein the instructions are to cause the computing device to display the first and second 2D images in an augmented reality environment.

Example 28 may include the subject matter of any one of Examples 20-27, wherein the second 2D image includes a first visual element not present in the first 2D image, wherein the first visual element includes a text label, and wherein the second 2D image includes a second visual element not present in the first 2D image, wherein the second visual element is based at least in part on sensor data, wherein the sensor data corresponds to an aspect of the real scene that is not in the visible electromagnetic spectrum.

Example 29 may include an apparatus to display enhanced stereographic imagery comprising: means for generating an enhanced stereoscopic image of a scene having a first two-dimensional (2D) image of the scene and a second 2D image of the same scene, wherein the second 2D image is visually or optically different than the first 2D image to create binocular rivalry perception of the scene when the first and second 2D images are respectively presented to a first and a second eye of a user at substantially the same time or in a coordinated manner; means for displaying the first 2D image to the first eye of the user; and means for displaying the second 2D image to the second eye of the user.

Example 30 may include the subject matter of Example 29, wherein the means for generating the enhanced stereoscopic image is to generate the enhanced stereoscopic image based at least in part on at least one camera image of a real scene captured by a camera.

Example 31 may include the subject matter of Example 30, further comprising means for sensing at least one aspect of the real scene, wherein the at least one aspect is not in the visible electromagnetic spectrum, and wherein the means for generating the enhanced stereoscopic image is to generate the second 2D image based at least in part on the at least one aspect of the real scene.

Example 32 may include the subject matter of Example 31, wherein the means for sensing the at least one aspect of the real scene includes means for capturing at least one of an infrared image or an ultraviolet image of the real scene, and wherein the means for generating the enhanced stereoscopic image is to generate the second 2D image based at least in part on at least one of the infrared image or the ultraviolet image.

Example 33 may include the subject matter of any one of Examples 30-32, wherein the means for generating the enhanced stereoscopic image includes: means for detecting edges of objects in at least one of the at least one camera image; means for removing at least some non-edge imagery from the at least one of the at least one camera image; and means for adding the visual element to the second 2D image.

Example 34 may include the subject matter Example 33, wherein the visual element includes a text label.

Example 35 may include the subject matter of any one of Examples 33-34, wherein the visual element is a first visual element and the first 2D image includes a second visual element not present in the second 2D image, wherein the first and second visual elements do not overlap when the first and second 2D images are viewed stereoscopically.

Example 36 may include the subject matter of Example 1, further comprising a camera coupled with the one or more processors; and a display coupled with the one or more processors, wherein the image generation module is to generate the first 2D image of the scene and the second 2D image of the same scene based at least in part on one or more camera images captured by a camera, and wherein the display module is to display the enhanced stereoscopic image of the scene to the user on the display.

Example 37 may include the subject matter of Example 36, further comprising: an infrared sensor coupled with the one or more processors; and an ultraviolet sensor coupled with the one or more processors, wherein the image generation module is to generate the second 2D image based at least in part on one or more camera images captured by the camera, infrared image data captured by the infrared sensor, and ultraviolet image data captured by the ultraviolet sensor.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus to display enhanced stereographic imagery, comprising:
   one or more processors;
   an image generation module, to be operated on the one or more processors, to generate an enhanced stereoscopic image of a scene, wherein the image generation module is to generate a first two dimensional (2D) image of the scene and a second 2D image of the same scene, the second 2D image to be visually or optically different than the first 2D image to create binocular rivalry perception of the scene when the first and second 2D images are respectively presented to a first and a second eye of a user at the same time or in a coordinated manner; and
   a display module, to be operated on the one or more processors, to display the enhanced stereoscopic image of the scene to the user, wherein the display module is to present the first 2D image of the scene to the first eye of the user and the visually or optically different second 2D image of the same scene to the second eye of the user at the same time or in a coordinated manner;
   wherein to generate the second 2D image to be visually or optically different than the first 2D image includes to generate a second object in the second 2D image without texture, the second object in the second 2D image corresponding to a first object in the first 2D image being generated with texture.

2. The apparatus of claim 1, wherein the image generation module is to generate the first 2D image based at least in part on a first camera image of a real scene and the image generation module is to generate the second 2D image based at least in part on a second camera image of the real scene.

3. The apparatus of claim 1, wherein to generate the second 2D image to be visually or optically different than the first 2D image further includes to generate the second 2D image to include a visual element not present in the first 2D image.

4. The apparatus of claim 3, wherein the visual element not present in the first 2D image includes a text label.

5. The apparatus of claim 4, wherein the visual element is a first visual element and the text label is a first text label, wherein the first 2D image includes a second visual element that includes a second text label that is not present in the second 2D image, wherein the first and second text labels do not overlap when viewed stereoscopically.

6. The apparatus of claim 1, wherein the enhanced stereoscopic image is a first enhanced stereoscopic image, the image generation module is to generate additional enhanced stereoscopic images, and the display module is to successively display the first enhanced stereoscopic image and the additional enhanced stereoscopic images as video stereoscopic imagery.

7. The apparatus of claim 1, further comprising:
   a camera coupled with the one or more processors; and
   a display coupled with the one or more processors,
   wherein the image generation module is to generate the first 2D image of the scene and the second 2D image of the same scene based at least in part on one or more camera images captured by the camera, and wherein the display module is to display the enhanced stereoscopic image of the scene to the user on the display.

8. The apparatus of claim 7, further comprising:
   an infrared sensor coupled with the one or more processors; and
   an ultraviolet sensor coupled with the one or more processors, wherein the image generation module is to generate the second 2D image based at least in part on one or more camera images captured by the camera, infrared image data captured by the infrared sensor, and ultraviolet image data captured by the ultraviolet sensor.

9. A method for enhanced stereographic image creation comprising:
generating, by a computer device, an enhanced stereoscopic image of a scene having a first two-dimensional (2D) image of the scene and a second 2D image of the same scene, wherein the second 2D image is visually or optically different than the first 2D image to create binocular rivalry perception of the scene when the first and second 2D images are respectively presented to a first and a second eye of a user at the same time or in a coordinated manner;
displaying the first 2D image to the first eye of the user; and
displaying the second 2D image to the second eye of the user;
wherein generating the enhanced stereoscopic image includes: detecting edges of objects in at least one camera image; and generating the second 2D image by removing at least some non-edge imagery of the objects from the at least one of the at least one camera image.

10. The method of claim 9, wherein the enhanced stereoscopic image is generated based at least in part on at least one camera image of a real scene captured by a camera.

11. The method of claim 10, further comprising sensing at least one aspect of the real scene, wherein the at least one aspect is not in a visible electromagnetic spectrum, and wherein generating the second 2D image is based at least in part on the sensed at least one aspect.

12. One or more non-transitory computer-readable media comprising instructions that cause a computing device, in response to execution of the instructions by the computing device, to:

generate an enhanced stereoscopic image of a scene having a first two-dimensional (2D) image of the scene and a second 2D image of the same scene, wherein the second 2D image is visually or optically different than the first 2D image to create binocular rivalry perception of the scene when the first and second 2D images are respectively presented to a first and a second eye of a user at the same time or in a coordinated manner;
display the first 2D image to the first eye of the user; and
display the second 2D image to the second eye of the user;
wherein to generate the second 2D image that is visually or optically different than the first 2D image includes to generate the second 2D image in grayscale with a red (R) channel inverted, while the first 2D image is being generated unaltered.

13. The one or more non-transitory computer-readable media of claim 12, wherein the instructions are further to cause the computing device to generate the first 2D image based at least in part on a first camera image of a real scene and to generate the second 2D image based at least in part on a second camera image of the real scene.

14. The one or more non-transitory computer-readable media of claim 12, wherein the instructions are to cause the computing device to display the first and second 2D images in a virtual reality environment.

15. The one or more non-transitory computer-readable media of claim 12, wherein the instructions are to cause the computing device to display the first and second 2D images in an augmented reality environment.

16. The one or more non-transitory computer-readable media of claim 12, wherein to generate the second 2D image that is visually or optically different than the first 2D image includes to generate the second 2D image that includes a first visual element not present in the first 2D image, wherein the first visual element includes a text label, and wherein the second 2D image includes a second visual element not present in the first 2D image.

* * * * *